(12) United States Patent
Tchamgoue et al.

(10) Patent No.: US 11,519,312 B2
(45) Date of Patent: Dec. 6, 2022

(54) EXHAUST GAS HEATER FOR AN EXHAUST GAS SYSTEM OF A COMBUSTION ENGINE

(71) Applicant: Purem GmbH, Neunkirchen (DE)

(72) Inventors: Herve Tchamgoue, Bad Urach (DE); Christian Walter, Fellbach (DE); Joachim Mueller, Metzingen (DE)

(73) Assignee: Purem GmbH, Neunkirchen (DE)

(*) Notice: Subject to any disclaimer, the term of this patent is extended or adjusted under 35 U.S.C. 154(b) by 0 days.

(21) Appl. No.: 17/314,590

(22) Filed: May 7, 2021

(65) Prior Publication Data
US 2021/0348535 A1 Nov. 11, 2021

(30) Foreign Application Priority Data
May 7, 2020 (DE) .................... 10 2020 112 391.4

(51) Int. Cl.
*F01N 3/20* (2006.01)
(52) U.S. Cl.
CPC ........ *F01N 3/2013* (2013.01); *F01N 2240/04* (2013.01); *F01N 2240/16* (2013.01); *F01N 2550/22* (2013.01)
(58) Field of Classification Search
CPC combination set(s) only.
See application file for complete search history.

(56) References Cited

U.S. PATENT DOCUMENTS

| | | | | |
|---|---|---|---|---|
| 4,152,377 A * | 5/1979 | Takata | ...................... | F02M 1/12 236/101 C |
| 5,053,603 A | 10/1991 | Wagner et al. | | |
| 5,101,095 A * | 3/1992 | Wagner | ..................... | H05B 3/76 123/549 |
| 5,582,805 A * | 12/1996 | Yoshizaki | ............. | F01N 13/009 422/174 |
| 5,953,909 A * | 9/1999 | Waltrip, III | ............... | F01N 3/26 60/275 |
| 9,488,084 B2 * | 11/2016 | Nagel | .................... | F01N 3/2026 |
| 10,731,530 B2 * | 8/2020 | Bartolo | ..................... | F01N 3/20 |

(Continued)

FOREIGN PATENT DOCUMENTS

| | | |
|---|---|---|
| CN | 104969004 A | 10/2015 |
| EP | 2 935 996 A1 | 10/2015 |
| EP | 3 825 528 A1 | 5/2021 |

OTHER PUBLICATIONS

U.S. Appl. No. 16/951,816, filed Nov. 18, 2020, (corresponds to DE102319131556—unpublished).

*Primary Examiner* — Binh Q Tran
(74) *Attorney, Agent, or Firm* — Walter Ottesen, P.A.

(57) ABSTRACT

An exhaust gas heater for an exhaust gas system of a combustion engine includes a disk-like carrier defining a heater longitudinal axis and having a first axial side. The carrier has an outer peripheral region disposed radially outwardly of the longitudinal axis and a radially inwardly disposed central region. A heating conductor has a heating region arranged on the first axial side of the carrier. At least one holding member holds the heating conductor on the carrier. The holding member includes at least one holding portion engaging around the heating conductor at the heating region thereof. The carrier has at least one fastening opening formed therein. The holding member includes at least one fastening portion engaging into the at least one fastening opening so as to be fixed to the carrier.

10 Claims, 4 Drawing Sheets

(56) References Cited

U.S. PATENT DOCUMENTS

| | | | |
|---|---|---|---|
| 10,801,388 B2 | 10/2020 | Culbertson et al. | |
| 2008/0028753 A1* | 2/2008 | Wagner | F01N 3/0238 60/295 |
| 2010/0126984 A1* | 5/2010 | Konieczny | B01D 46/4218 219/520 |
| 2021/0156289 A1 | 5/2021 | Kurpejovic et al. | |

* cited by examiner

EXHAUST GAS HEATER FOR AN EXHAUST GAS SYSTEM OF A COMBUSTION ENGINE

CROSS REFERENCE TO RELATED APPLICATION

This application claims priority of German patent application no. 10 2020 112 391.4, filed May 7, 2020, the entire content of which is incorporated herein by reference.

TECHNICAL FIELD

The present invention relates to an exhaust gas heater for an exhaust gas system of a combustion engine.

BACKGROUND

Post-published German patent application DE 10 2019 131 556 (corresponding to U.S. application Ser. No. 16/951, 816, filed Nov. 18, 2020, and incorporated herein by reference), describes an exhaust gas heater which has a disk-like carrier, constructed from metal material, having an outer circumferential region, which is arranged radially on the outside with respect to a heater longitudinal axis, and a central region, which is axially offset with respect to the outer circumferential region, so that the disk-like carrier has in principle a conical structure. On a first axial side, oriented in the upstream direction, of the disk-like carrier there is arranged a spirally wound heating region of a heating conductor. The heating conductor is fixed with its heating region to the first axial side of the disk-like carrier by a plurality of holding members of comb-like form. For this purpose, the comb-like holding members engage with respective holding portions around the heating region of the heating conductor on its side remote from the carrier. Fastening portions of the holding members engaging between winding regions, located in a radially staggered manner, of the heating region are fixed to the first axial side of the disk-like carrier by substance-to-substance bonding.

SUMMARY

An object of the present invention is to provide an exhaust gas heater for an exhaust gas system of a combustion engine, in which a heating conductor can be stably fixed to a carrier in a simple manner.

This object is achieved according to the invention by an exhaust gas heater for an exhaust gas system of a combustion engine, comprising:
a disk-like carrier having an outer circumferential region, which is arranged radially on the outside with respect to a heater longitudinal axis, and a central region, which is arranged radially on the inside,
a heating conductor having a heating region arranged on a first axial side of the carrier,
at least one holding member for holding the heating conductor on the carrier,
wherein the holding member comprises at least one holding portion which engages around the heating conductor in its heating region and at least one fastening portion which engages into a fastening opening in the carrier and is fixed to the carrier.

In the exhaust gas heater according to the invention, one fastening portion or a plurality of fastening portions engages or engage into respective fastening openings in the carrier, so that the fastening portions are accessible from a second axial side of the carrier and can accordingly be fixed in a simple manner to the carrier, or the fastening portions are able to enter into fastening interaction with the carrier on the second axial side of the carrier.

In order, in a form of the heating conductor that permits a high heating capacity, to be able to fix the heating conductor stably to the carrier, it is proposed that the heating conductor is spirally wound in its heating region and comprises a plurality of heating conductor winding portions which are radially staggered relative to one another, and that at least one holding member in association with at least two radially successive heating conductor winding portions has in each case a holding portion and, between at least two holding portions, a fastening portion.

The stable fastening action can further be assisted in that at least one holding member comprises a plurality of successive alternating holding portions and fastening portions. In particular, it can be provided for this purpose that the at least one holding member is of wave-like form with successive alternating first wave loop regions and second wave loop regions, wherein the first wave loop regions form holding portions and the second wave loop regions form fastening portions.

In order to avoid excessive local loading of the heating conductor it is proposed that at least one, preferably each, holding portion has a shape adapted to an outer circumferential contour of the heating region. For example, it can be provided that the heating region has a circular outer circumferential contour and that at least one, preferably each, holding portion is bent in the manner of a circle in its length portion engaging around the heating region.

For a fastening that is stable even under considerable thermal and dynamic loads, at least one holding member can be fixed to the carrier with at least one fastening portion on a second axial side of the carrier by substance-to-substance bonding, preferably welding.

This can be achieved in that at least one second wave loop region engaging into a fastening opening of the carrier is fixed to the carrier by substance-to-substance bonding in its length portion protruding from the second axial side of the carrier.

In a further embodiment according to the invention, fixing of a holding member to the carrier can be carried out in that at least one holding member is fixed to the carrier with at least one fastening portion by positive engagement. For this purpose, at least one fastening portion which engages into a fastening opening of the carrier can engage behind the carrier on a second axial side.

For stable fixing, extended over a larger region, to the carrier, a plurality of fastening openings arranged radially in succession can be provided in the carrier, wherein at least one holding member engages with a plurality of fastening portions into a plurality of the radially successive fastening openings. Furthermore, stable fixing can be assisted in that at least one holding member is arranged so as to extend substantially radially. For this purpose there can be formed on the carrier, for example, a plurality of webs which extend preferably from radially on the inside to radially on the outside. A plurality of fastening openings can thereby be provided in at least one, preferably each, web.

For a thermally stable form, the carrier can be in the form of a metal disk. At least one holding member can be in the form of a shaped metal part. This can be achieved, for example, by bending a wire-like blank of metal material, such as, for example, spring steel or the like, into the shape, for example the wave-like shape, that is to be provided for the holding member.

The invention relates further to an exhaust gas system for a combustion engine of a vehicle having an exhaust gas heater configured according to the invention.

BRIEF DESCRIPTION OF THE DRAWINGS

The invention will now be described with reference to the drawings wherein.

DESCRIPTION OF THE PREFERRED EMBODIMENTS

Figure 1:
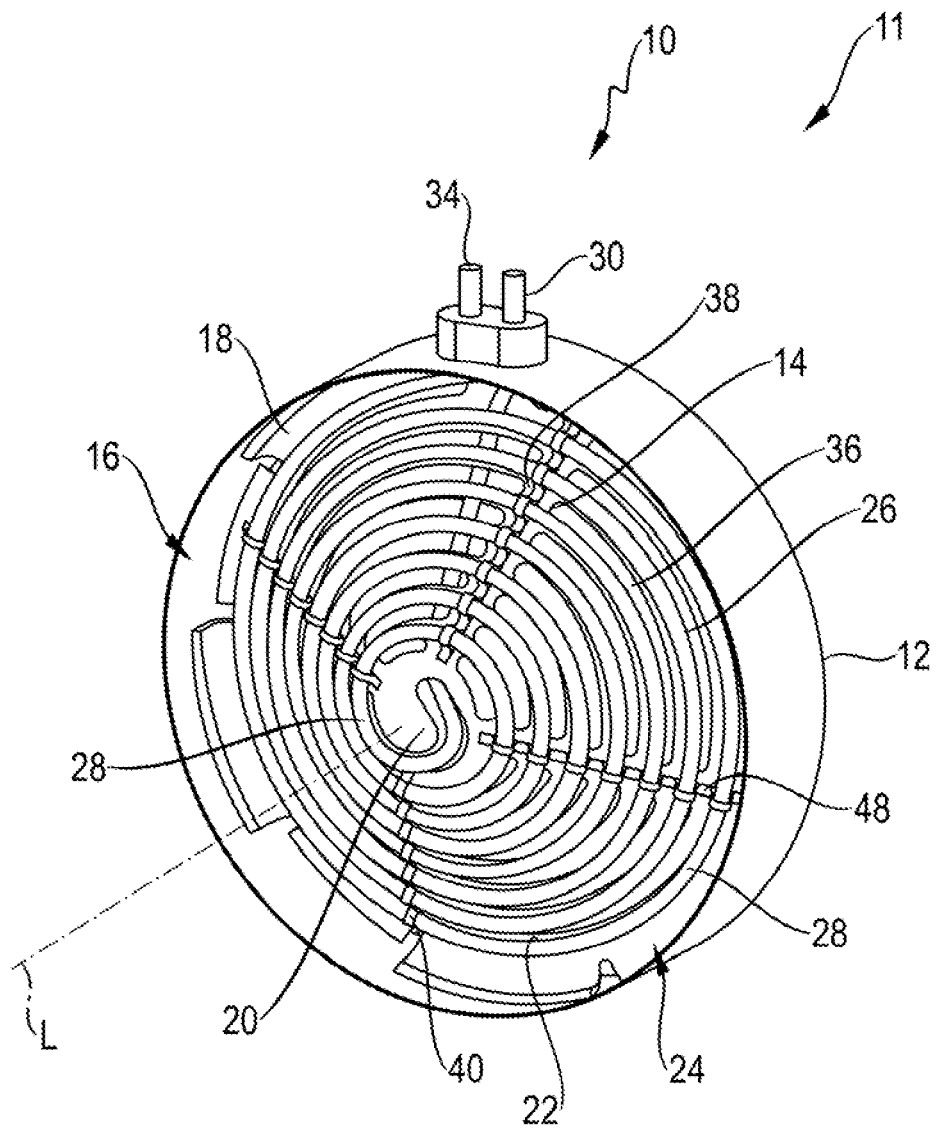
FIG. 1 is a perspective view of an exhaust gas heater for an exhaust gas system of a combustion engine.

In FIG. 1, an exhaust gas heater for an exhaust gas system 11 of a combustion engine is designated generally 10. The exhaust gas heater 10 comprises a tubular housing 12 which can provide a portion of an exhaust pipe of the exhaust gas system 11 or can be provided by an exhaust pipe of the exhaust gas system 11. Inside the housing 12 there is arranged a carrier 14 which is in the form of a shaped sheet-metal part and is in principle disk-like. The disk-like carrier 14 has in an outer circumferential region 16 arranged radially on the outside with respect to a heater longitudinal axis L a plurality of axially bent fastening lugs 18, with which it is fixed to the inner circumference of the tubular housing 12, for example by welding. A central region 20 arranged radially on the inside, or centrally, with respect to the heater longitudinal axis L is preferably offset axially in the upstream direction with respect to the outer circumferential region 16, so that, in a fluidically advantageous embodiment, an increased heating interaction surface can be provided.

A heating conductor designated generally 22 is fixed to the carrier 14. The heating conductor 22 is constructed with a heating wire which is arranged in a sheath and can be warmed by the application of an electric voltage, wherein the sheath surrounding the heating wire also establishes electrical insulation with respect to the carrier 14 constructed of metal material. On a first axial side 24, located at the front in FIG. 1 and oriented in the upstream direction in the exhaust gas system 11, of the carrier 14 there is arranged a spirally wound heating region 26 of the heating conductor 22, so that a plurality of winding portions 28 located in a radially staggered manner relative to one another cover the carrier 14 on its first axial side 24. In the central region 20, the radially innermost winding portion of winding portions 28 of the heating conductor 22 passes through an opening provided in the carrier 14, so that a connecting portion 30, extending from radially on the inside to radially on the outside, of the heating conductor 22 extends radially outwards on a second axial side 32 (see FIGS. 2 and 3) of the carrier 14 and, together with a further connecting portion 34, which connects to the radially outermost winding portion of winding portions 28 of the heating region 26, protrudes outwards through the tubular housing 12. Electrical contacting of the heating conductor 22 can take place in these connecting portions 30, 34. The parts of the connecting portions 30, 34 that protrude radially outwards can be provided by contact elements. These contact elements are held in an electrically insulated manner with respect to the tubular housing 12 and are formed separately and are electrically conductively connected to the heating conductor 22.

In order to allow exhaust gas to pass through the carrier 14 there are formed therein a plurality of exhaust gas through-openings 36 which are radially staggered relative to one another and follow one another in the circumferential direction. Webs 38 (see FIGS. 2 and 3) which extend approximately radially outwards are formed between successive exhaust gas through-openings 36 in the circumferential direction. In the region of these webs 38, the heating conductor 22 is fixed to the first axial side 24 of the carrier 14 in each case by a holding member 40 extending substantially radially. In the embodiment shown, a total of four such webs 38 and accordingly also four holding members 40 are provided in an approximately star-shaped configuration. It will be understood that a different number of webs 38 can be provided, and that the heating conductor 22 does not necessarily have to be fixed to the carrier 14 by such a holding member 40 at each of the webs 38.

The holding members 40 constructed, for example, of spring steel wire are in principle of wave-like form and have alternating first wave loop regions 42 and second wave loop regions 44. With the first wave loop regions 42, a corresponding holding member 40 engages around the heating region 26 of the heating conductor 22 on the side thereof remote from the first axial side 24 of the carrier 14. In order to produce contact that is uniform over the circumference, the first wave loop regions 42 are adapted to the outer circumferential contour of the heating conductor 22 in its heating region 26. This has, for example, a circular outer circumferential contour, so that the first wave loop regions 42 correspondingly have a configuration bent in the manner of a circle. The first wave loop regions 42 each provide holding portions 46 on a corresponding holding member 40.

Figure 2:
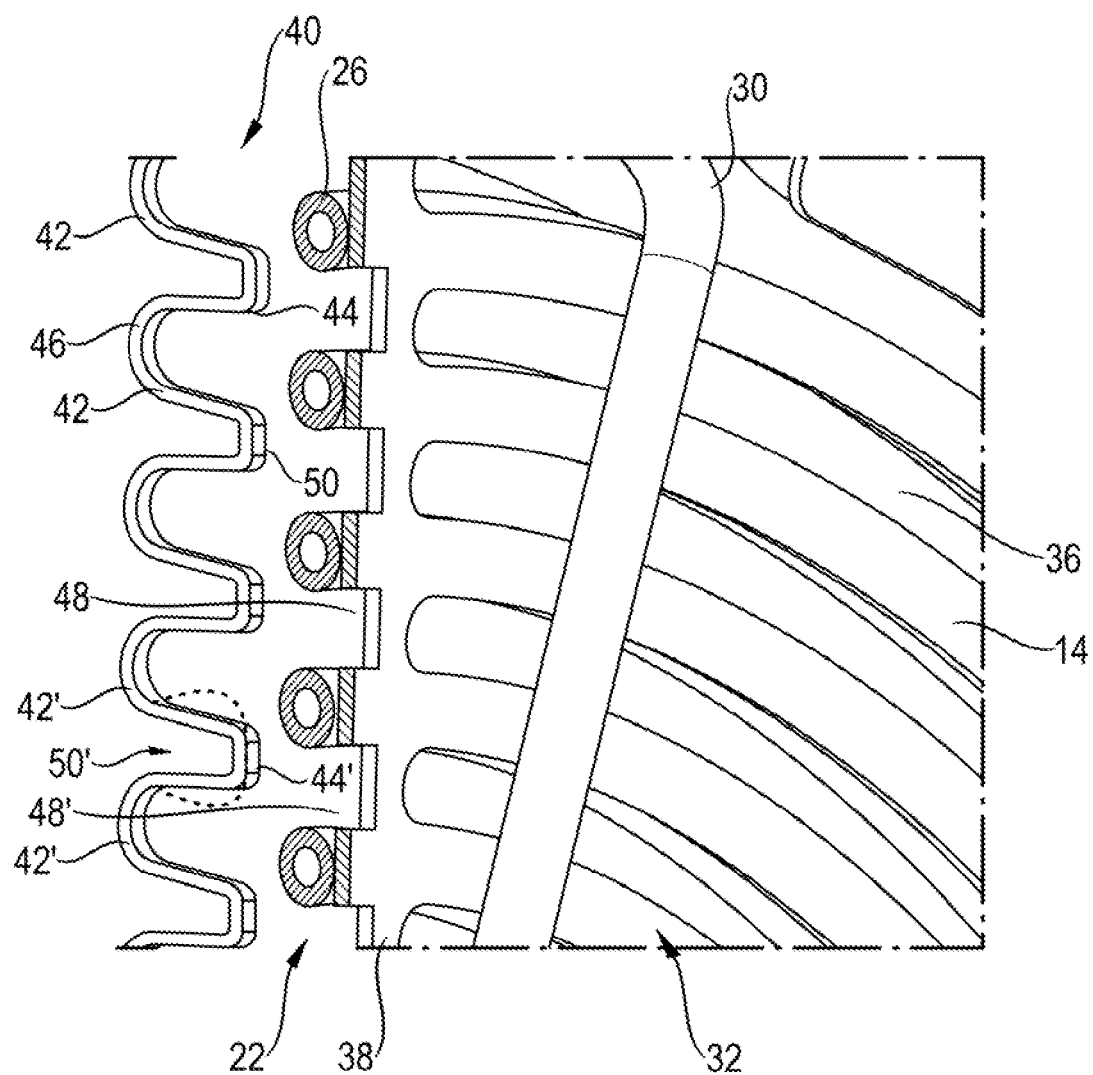
FIG. 2 is a perspective detail view of the exhaust gas heater of FIG. 1 before a holding member is fitted to a carrier of the exhaust gas heater.
Figure 3:
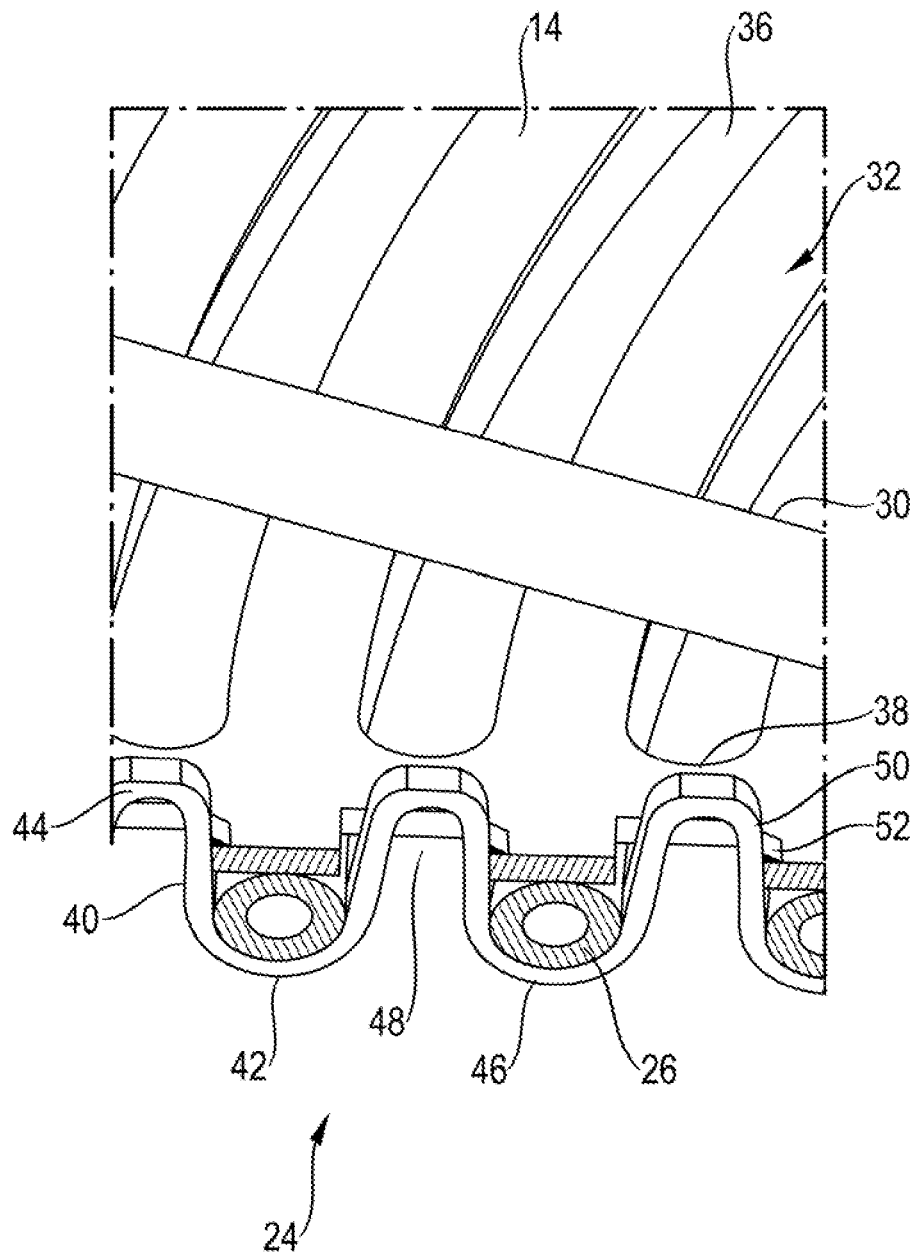
FIG. 3 is a detail view corresponding to FIG. 2 with a holding member fitted to the carrier; and, FIG. 4 is a sectional view showing the fixing of a heating conductor to a carrier by a holding member.

In association with the second wave loop regions 44, fastening openings 48 are formed in the webs 38 of the carrier 14 as shown in FIGS. 2 and 3. The second wave loop regions 44, which each provide a fastening portion 50, each engage into such a fastening opening 48, preferably in such a manner that the second wave loop regions 44 providing the fastening portions 50 protrude from the second axial side 32 of the carrier 14. In these fastening portions 50 protruding from the second axial side 32, a corresponding holding member 40 is fastened to the carrier 14 by substance-to-substance bonding, in particular by welded joints 52, so that a fastening of the holding members 40 to the carrier 14 that is stable to dynamic mechanical loads and also thermal loads is achieved. Such a welded joint 52 is preferably produced at each fastening portion 50. Fixing could in principle also take place in this manner at only some of the fastening portions 50, for example at every second fastening portion 50.

Figure 4:
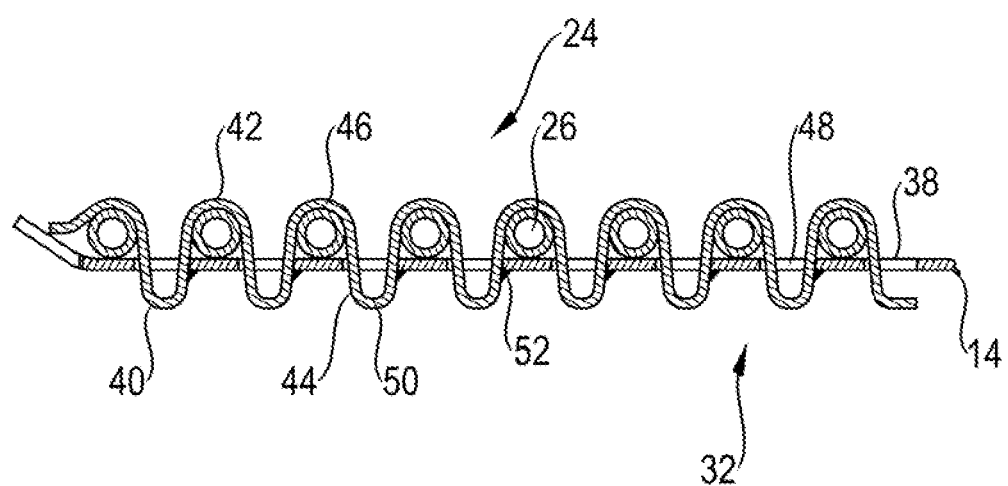

FIG. 4 shows the holding member 40 fixing a heating conductor to the carrier 14.

An alternative embodiment is shown in FIG. 2 in connection with a fastening portion 50'. As is indicated by the broken line, the second wave loop region 44' that provides this fastening portion 50' could, starting from its connection to the adjacent first wave loop regions 42', first widen in the direction of extension of the holding member 40, that is, be configured with an omega-shaped structure, for example. When the second wave loop region 44' is passed through an associated fastening opening 48', the second wave loop region 44' is first compressed. After it has been inserted fully into the associated fastening opening 48', the second wave loop region 44' springs apart again, so that it engages behind the carrier 14 on the second axial side 32 and in this manner achieves a positive fastening for the holding member 40.

Such a positive fastening action could be achieved in all or in some of the fastening portions provided on one of the holding members. The positive fastening action owing to the shaping of the fastening portions can in principle also be combined with the substance-to-substance bonding, that is, the provision of one or optionally also two welded joints of a corresponding fastening portion with the carrier.

With the holding members used for fixing the heating conductor, a fastening action is achieved that is simple but nevertheless stable and resistant to thermal and mechanical loads. It is particularly stable because the holding members are provided in the region of the substantially radially extending webs provided on the carrier.

In an alternative embodiment, such holding members could also cooperate with the carrier at other circumferential regions of the carrier and, for example, be positioned so as to engage into the exhaust gas through-openings. In alternative embodiments, the holding members can also be so configured that they extend beyond the heating region of the heating conductor only over a portion of the radial extent thereof, wherein holding members positioned distributed in the circumferential direction can then fix different radial regions of the heating region to the carrier.

It is understood that the foregoing description is that of the preferred embodiments of the invention and that various changes and modifications may be made thereto without departing from the spirit and scope of the invention as defined in the appended claims.

What is claimed is:

1. An exhaust gas heater for an exhaust gas system of a combustion engine, the exhaust gas heater comprising:
    a disk-like carrier defining a heater longitudinal axis and having a first axial side;
    said disk-like carrier having an outer peripheral region disposed radially outwardly of said longitudinal axis;
    said disk-like carrier further having a radially inwardly disposed central region;
    a heating conductor having a heating region arranged on said first axial side of said carrier;
    at least one holding member for holding said heating conductor on said carrier;
    said at least one holding member including at least one holding portion engaging around said heating conductor at said heating region thereof;
    said carrier having at least one fastening opening formed therein;
    said at least one holding member further including at least one fastening portion engaging into said at least one fastening opening so as to be fixed to said carrier;
    said at least one holding member including a plurality of successively alternating holding portions and fastening portions;
    said at least one holding member having a wave-like form defining a plurality of successive alternating first wave loop regions and a plurality of second wave loop regions;
    said first wave loop regions defining a plurality of said holding portions;
    said second wave loop regions defining a plurality of said fastening portions;
    said carrier having a second axial side opposite said first axial side;
    said carrier having a plurality of fastening openings formed therein;
    said plurality of second wave loop regions engaging into said plurality of fastening openings so as to protrude from said second axial side of said carrier; and,
    at least one of said second wave loop regions defining one of said plurality of fastening portions being fixed to said carrier on said second axial side of said carrier via a substance-to-substance bond.

2. The exhaust gas heater of claim 1, wherein:
    said heating conductor is spirally wound in the heating region thereof to form a plurality of winding segments arranged radially successively staggered relative to one another;
    said at least one holding member has at least two of said holding portions corresponding to respective ones of at least two of said radially successively staggered winding segments; and,
    said at least one fastening portion is disposed between said at least two holding portions.

3. The exhaust gas heater of claim 1, wherein said heating conductor has an outer circumferential contour in said heating region thereof; and, each of said holding portions has a shape adapted to said outer circumferential contour of said heating region.

4. The exhaust gas heater of claim 3, wherein said outer circumferential contour of said heating region is a circular outer circumferential contour; and, each of said holding portions is circularly bent in its length portion engaging around said heating region.

5. The exhaust gas heater of claim 1, wherein said substance-to-substance bond is a weld.

6. The exhaust gas heater of claim 1, wherein said at least one holding member is arranged so as to extend substantially radially.

7. The exhaust gas heater of claim 1, wherein said carrier further includes a plurality of webs extending radially from said central region to said outer peripheral region; and, at least one of said webs has a plurality of fastening openings formed therein.

8. The exhaust gas heater of claim 7, wherein each of said webs has a plurality of said fastening openings formed therein.

9. The exhaust gas heater of claim 1, wherein said exhaust gas heater is configured to include at least one of the following: said carrier being configured as a metal disk and said at least one holding member being configured to have the form of a shaped metal part.

10. An exhaust gas system for a combustion engine, said exhaust gas system comprising:
    an exhaust gas pipe for conducting exhaust gas therethrough;
    an exhaust gas heater mounted in said exhaust gas pipe;
    the exhaust gas heater including:
    a disk-like carrier defining a heater longitudinal axis and having a first axial side;
    said disk-like carrier having an outer peripheral region disposed radially outwardly of said longitudinal axis;
    said disk-like carrier further having a radially inwardly disposed central region;
    a heating conductor having a heating region arranged on said first axial side of said carrier;
    at least one holding member for holding said heating conductor on said carrier;
    said at least one holding member including at least one holding portion engaging around said heating conductor at said heating region thereof;
    said carrier having at least one fastening opening formed therein;

said at least one holding member further including at least one fastening portion engaging into said at least one fastening opening so as to be fixed to said carrier;
said at least one holding member including a plurality of successively alternating holding portions and fastening portions;
said at least one holding member having a wave-like form defining a plurality of successive alternating first wave loop regions and a plurality of second wave loop regions;
said first wave loop regions defining a plurality of said holding portions and said second wave loop regions defining a plurality of said fastening portions;
said carrier having a second axial side opposite said first axial side;
said carrier having a plurality of fastening openings formed therein;
said second wave loop regions engaging into said plurality of fastening openings so as to protrude from said second axial side of said carrier; and,
at least one of said second wave loop regions defining one of said plurality of fastening portions being fixed to said carrier on said second axial side of said carrier via a substance-to-substance bond.

* * * * *

UNITED STATES PATENT AND TRADEMARK OFFICE
CERTIFICATE OF CORRECTION

| | | |
|---|---|---|
| PATENT NO. | : 11,519,312 B2 | Page 1 of 1 |
| APPLICATION NO. | : 17/314590 | |
| DATED | : December 6, 2022 | |
| INVENTOR(S) | : Tchamgoue et al. | |

It is certified that error appears in the above-identified patent and that said Letters Patent is hereby corrected as shown below:

On the Title Page

Under item (56), OTHER PUBLICATIONS, second Line: delete "DE102319131556" and insert -- DE102019131556 -- therefor.

Signed and Sealed this
Thirteenth Day of February, 2024

Katherine Kelly Vidal
*Director of the United States Patent and Trademark Office*